United States Patent [19]

Umeno et al.

[11] Patent Number: 5,449,107
[45] Date of Patent: Sep. 12, 1995

[54] WELD BACKING

[75] Inventors: Kenji Umeno; Tatsuya Oishi, both of Nagasaki; Yuichi Kimura, Hirakata; Akitoshi Masamura, Hirakata; Akio Iwasaki, Hirakata, all of Japan

[73] Assignee: Kabushiki Kaisha Komatsu Seisakusho, Tokyo, Japan

[21] Appl. No.: 244,050

[22] PCT Filed: Sep. 9, 1993

[86] PCT No.: PCT/JP93/01290

§ 371 Date: Aug. 3, 1994

§ 102(e) Date: Aug. 3, 1994

[87] PCT Pub. No.: WO94/05458

PCT Pub. Date: Mar. 17, 1994

[30] Foreign Application Priority Data

Sep. 10, 1992 [JP] Japan ................................. 4-242312

[51] Int. Cl.⁶ .................................................. B23K 37/02
[52] U.S. Cl. ................................... 228/50; 228/46
[58] Field of Search ................... 228/46, 50, 216, 222; 219/160

[56] References Cited

U.S. PATENT DOCUMENTS

| 433,589 | 8/1890 | Adams | 228/50 |
| 1,922,324 | 8/1933 | Price et al. | 228/50 |
| 4,874,439 | 10/1989 | Akutsu | 148/433 |

FOREIGN PATENT DOCUMENTS

| 53-20460 | 8/1978 | Japan . |
| 55-158899 | 12/1980 | Japan . |
| 63-157825 | 6/1988 | Japan . |
| 63-206440 | 8/1988 | Japan . |
| 3-118979 | 5/1991 | Japan . |
| 4-138872 | 5/1992 | Japan . |
| 4-200896 | 7/1992 | Japan . |
| 5-33985 | 5/1993 | Japan . |

*Primary Examiner*—Samuel M. Heinrich
*Attorney, Agent, or Firm*—Millen, White, Zelano & Branigan

[57] ABSTRACT

A reusable weld backing capable of withstanding long use, which is held against the underside of a workpiece to provide weld-metal support in full penetration welding, the weld backing comprising a substrate made from copper or a copper alloy; and a copper-aluminum alloy layer containing 9 to 23% by weight of aluminum and formed at least on the surface of the substrate, the surface being on the side which faces a weld zone.

14 Claims, 12 Drawing Sheets

WELD BACKING

TECHNICAL FIELD

The present invention relates to a weld backing that is held against the underside of a workpiece to provide adequate weld-metal support in full penetration welding and more particularly, to a weld backing suited for use with a movable backing positioning system.

BACKGROUND ART

In prior art full penetration welding using a backing material, the following procedures are usually taken. Firstly, a weld backing is formed from copper or a copper alloy with its length being identical to the length of the weld line of a workpiece to be welded and its configuration fitting to the shape of the weld line. Such a weld backing is held against the underside of the weld zone where a groove is formed and is fixed in position being supported by a number of supporting members. In this condition, a welding machine is moved along the weld line to weld throughout the entire length of the weld line. After completion of welding, the weld backing as well as its supporting members are removed.

However, the conventional weld backing made from copper or a copper alloy suffers from the following disadvantages: (1) the weld backing is too soft and therefore liable to wear; and (2) the penetration bead tends to stick to the weld backing in high temperature zones. For these reasons, the conventional weld backing is not reusable and cannot withstand long service. The present invention has been made in order to overcome such disadvantages and therefore an object of the invention is to provide a weld backing which is repeatedly usable in full penetration welding and can withstand long service.

DISCLOSURE OF THE INVENTION

The above and other objects can be achieved by a weld backing according to the invention which is held against the underside of a workpiece to provide weld-metal support in full penetration welding, the weld backing comprising: a substrate made from copper or a copper alloy; and a copper-aluminum alloy layer containing 9 to 23% by weight of aluminum and formed at least on the surface of the substrate, the surface being on the side which faces a weld zone.

By forming the copper-aluminum alloy layer which contains 9 to 23% by weight of aluminum and is highly abrasion-resistant, on the substrate made from copper or a copper alloy, the abrasion resistance of the surface of the weld backing can be highly improved. Further, since the copper-aluminum alloy has bad affinity to a bead, the penetration bead does not stick to the surface of the weld backing and therefore the smoothness of the backing surface can be ensured. These characteristics enable the weld backing to be reused and to be used for a long period.

The copper-aluminum alloy layer contains 9 to 23% by weight of aluminum, for the reason that when the aluminum content is less than 9% by weight, satisfactory hardness cannot be obtained and when it exceeds 23% by weight, the weld backing becomes too brittle for practical use although the hardness obtained is satisfactory. The preferable aluminum content is in the range of 16 to 22% by weight. When the content falls in this range, the copper-aluminum alloy layer is not brittle but possesses high hardness. The hardness of the copper-aluminum alloy layer is preferably 250 to 700 mHv in practice and its thickness is preferably 20 to 300 μm.

The weld backing may include a cooling means for cooling the copper-aluminum alloy layer. By cooling the copper-aluminum alloy layer with the cooling means, the solidification of a penetration bead maintained by surface tension can be speeded up and the resistance to abrasion and adherence at the surface of the weld backing can be markedly improved. The cooling means may be a cooling medium that is circulated or stored within an interior space of the weld backing.

In a preferable form, the weld backing is made from copper or a copper alloy, and the copper-aluminum alloy layer is formed on the substrate made from the copper or copper alloy, and the cooling medium serving as the cooling means for cooling the copper-aluminum alloy layer is circulated or stored within the interior space defined in the weld backing. Further, the weld backing may be composed of a box-shaped body portion which is open at one end and closed at the other end so as to form a bottom; and a lid portion for closing the opening end of the box-shaped body portion. At least such a lid portion is formed from copper or a copper alloy. The copper or copper alloy forming the lid portion serves as the substrate and the copper-aluminum alloy layer is formed on the surface of the copper or copper alloy. The interior space is defined by the box-shaped body portion and the lid portion and the cooling medium is circulated or stored in this space as the cooling means for cooling the copper-aluminum alloy layer.

The cooling medium such as cooling water circulating within the interior space may be introduced into the interior space through an inlet formed at one side of the interior space and let out through an outlet formed at the other side of the interior space. These inlet and outlet may be formed as to be offset from each other. Alternatively, the inlet and outlet through which the cooling medium may be introduced and let out may be formed at the same side with a weir between.

The weld backing may have a desired configuration as far as it conforms to the shape of a joint to be welded. For example, the weld backing may be substantially pentagonal or circular in section.

Preferably, the copper-aluminum alloy layer is formed by applying aluminum infiltration treatment to the surface of the substrate made from copper or a copper alloy. For instance, the copper-aluminum alloy layer may be formed in such a way that: after the substrate has been put in a half-closed vessel together with aluminum penetrant which contains (i) iron-aluminum alloy powder or aluminum power; (ii) alumina powder; and (iii) ammonium chloride powder serving as a penetration accelerator, the vessel is constantly heated to 500° to 750° C. for 5 to 15 hours while inert gas or reducing gas being introduced into the vessel.

The weld backing of the invention is preferably mounted on a movable backing positioning system comprising:

(a) a wheeled carriage for movably towards the face of the workpiece, supporting the weld backing at the underside of the workpiece so as to face the weld backing to the workpiece, the carriage being movable along a weld line of the workpiece;

(b) follower elements attached to the weld backing, which follow the movement along the underside of the workpiece, being in contact with the underside of the workpiece all the time to maintain the gap between the underside of the workpiece and the weld backing to be suitable for obtaining desired bead thickness; and (c) energizing means such as resilient members for energizing the weld backing such that the follower elements are always in contact with the underside of the workpiece.

When the weld backing is mounted on such a movable backing positioning system, frequent replacement of the weld backing is no longer needed since the weld backing has high resistance to abrasion and adherence, and therefore the operational efficiency of the movable backing positioning system can be improved.

BRIEF DESCRIPTION OF THE DRAWINGS

FIG. 1 is an exploded perspective view of the weld backing;

FIG. 2 is a sectional view of the weld backing;

FIG. 3 is a graph showing the sectional composition of a copper-aluminum alloy layer obtained by the EPMA analysis.

FIG. 4 is a graph showing the hardness of the copper-aluminum alloy layer;

FIG. 5 is a perspective view of the movable backing positioning system;

FIG. 6 is a side view of the movable backing positioning system;

FIG. 7 is a plan view of the movable backing positioning system;

FIG. 8 is a view of the movable backing positioning system as it is in operation for full penetration welding;

FIG. 9 is a sectional view of the workpiece which has been welded;

FIG. 11 is a perspective view of the movable backing positioning system;

FIG. 12 is a side view of the movable backing positioning system;

FIG. 13 is a rear elevation of the movable backing positioning system;

FIG. 14 is for explaining the structure of the weld backing of the second application example in detail;

FIG. 15 is for explaining a modification of the weld backing of the second application example;

BEST MODE FOR CARRYING OUT THE INVENTION

With reference to the drawings, preferred embodiments of a weld backing according to the invention and examples of the application of the weld backing to a movable backing positioning system will be hereinafter described.

Figure 1:
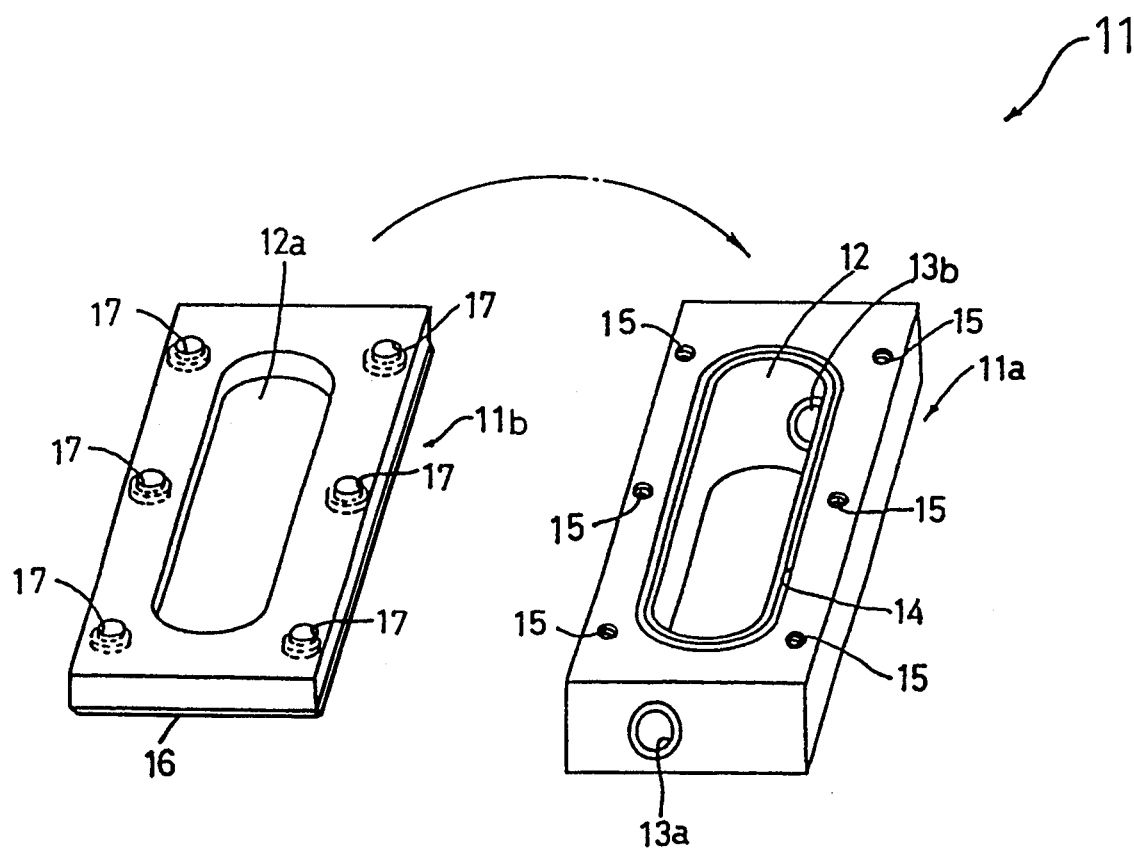
FIGS. 1 to 4 are for explaining a preferred embodiment of the weld backing of the invention.
Figure 2:
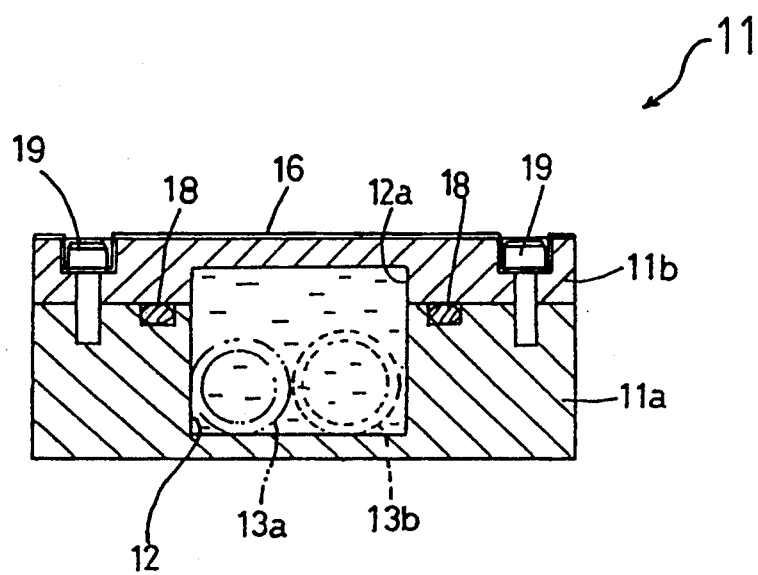

In FIGS. 1 and 2, there is shown a hollow, rectangular parallelepiped weld backing 11. The weld backing 11 is comprised of a backing box-shaped body portion 11a which is open at the top and closed at the bottom and a backing lid portion 11b placed on the top of the backing box-shaped body portion 11a so as to close the opening. The interior space of the backing box-shaped body portion 11a is a cooling water chamber 12 that is communicated with a cooling water inlet 13a provided at the front part thereof and a cooling water outlet 13b provided at the rear part thereof. These cooling water inlet 13a and cooling water outlet 13b are so positioned as to be offset from each other. Cooling water is introduced into the interior of the cooling water chamber 12 through the cooling water inlet 13a and expelled from the weld backing 11 through the cooling water outlet 13b. With the circulation of cooling water, the weld backing 11, especially the backing lid portion 11b is kept cool. On the top of the backing box-shaped body portion 11a is formed a ring groove 14 enclosing the opening. Six threaded holes 15 are formed outside the ring groove 14. At least the backing lid portion 11b includes a substrate formed from a material having good heat conductivity such as copper or copper alloys (e.g., copper-chrome). A copper-aluminum alloy layer 16 in which aluminum is diffused and infiltrated is formed on at least the surface of the substrate facing the weld zone, thereby improving the abrasion resistance and adherence resistance of the weld backing 11. The backing lid portion 11b is interiorly provided with a cooling water chamber 12a at the center thereof, the contour of which is identical with that of the opening of the backing box-shaped body portion 11a. Outside the cooling water chamber 12a are defined bolt holes 17 corresponding to the threaded holes 15. The weld backing 11 as described above is fabricated in the following procedures: After a seal member 18 such as O-rings or gaskets has been fitted in the ring groove 14 of the backing box-shaped body portion 11a, the backing lid portion 11b is overlaid on the backing box-shaped body portion 11a as indicated by an arrow in FIG. 1 so that the opening is closed. Then, flush head bolts 19 are inserted in the bolt holes 17 of the backing lid portion 11b and screwed into the threaded holes 15 of the backing box-shaped body portion 11a.

Experience has shown by heating the copper-aluminum alloy containing 9 to 23% by weight of aluminum to the proximity of 570° C., either the $(\alpha+\gamma_2)$ eutectoid phase, the $\gamma_2$ phase or the $\delta$ phase is obtained, depending on the ratio of aluminum contained in the alloy. (9 wt % $\leq$ Al < 16 wt %→the $(\alpha+\gamma_2)$ eutectoid phase; 16 wt % $\leq$ Al $\leq$ 22 wt %→the $\gamma_2$ phase; and 22 wt % < Al $\leq$ 23 wt %→the $\gamma_2$ and $\delta$ phases). The $\alpha$ phase of copper aluminum alloys is soft, having a hardness of 100 mHv or less, while the hardness of the $\gamma_2$ phase is 600 to 750 mHv. The hardness of the $(\alpha+\}_2)$ eutectoid phase in which both the $\alpha$ phase and the $\gamma$ phase exist is intermediate between these phases, i.e., 200 to 350 mHv, depending on the percentage of the $\gamma_2$ phase contained. Therefore, in case that the Al content is Al < 9 wt %, the alloy layer after heating treatment has the soft $\alpha$ phase as the matrix, which exhibits unsatisfactory abrasion resistance In case that the Al content is Al > 23 wt %, the alloy layer has only the brittle $\delta$ phase, and therefore the alloy layer is easily peeled off or dropped off by a little shock. In view of the above facts, the aluminum content of the copper-aluminum alloy layer 16 formed on the backing lid portion 11b is most preferably in the range of 16 wt %≦Al≦22 wt with which only the $\gamma_2$ phase is formed. However, the ($\alpha+\gamma_2$) eutectoid phase and the $\gamma_2$ and $\delta$ phases are also acceptable, in which case, the Al content is in the range of 9 wt %≦Al≦23 wt %.

In this embodiment, the copper-aluminum alloy layer 16 of the weld backing 11 is formed in such a way that, after the backing lid portion 11b has been put in a half-closed vessel (not shown) together with an aluminum penetrant containing 30% by weight of aluminum powder; 69% by weight of alumina powder; and 1% by weight of ammonium chloride, the half-closed vessel is heated to 570° C. for 8 hours while argon gas being introduced into the vessel, so that the copper-aluminum alloy layer 16 is formed on the backing lid portion 11b formed from a copper-chrome alloy in this embodiment.

Figure 3:
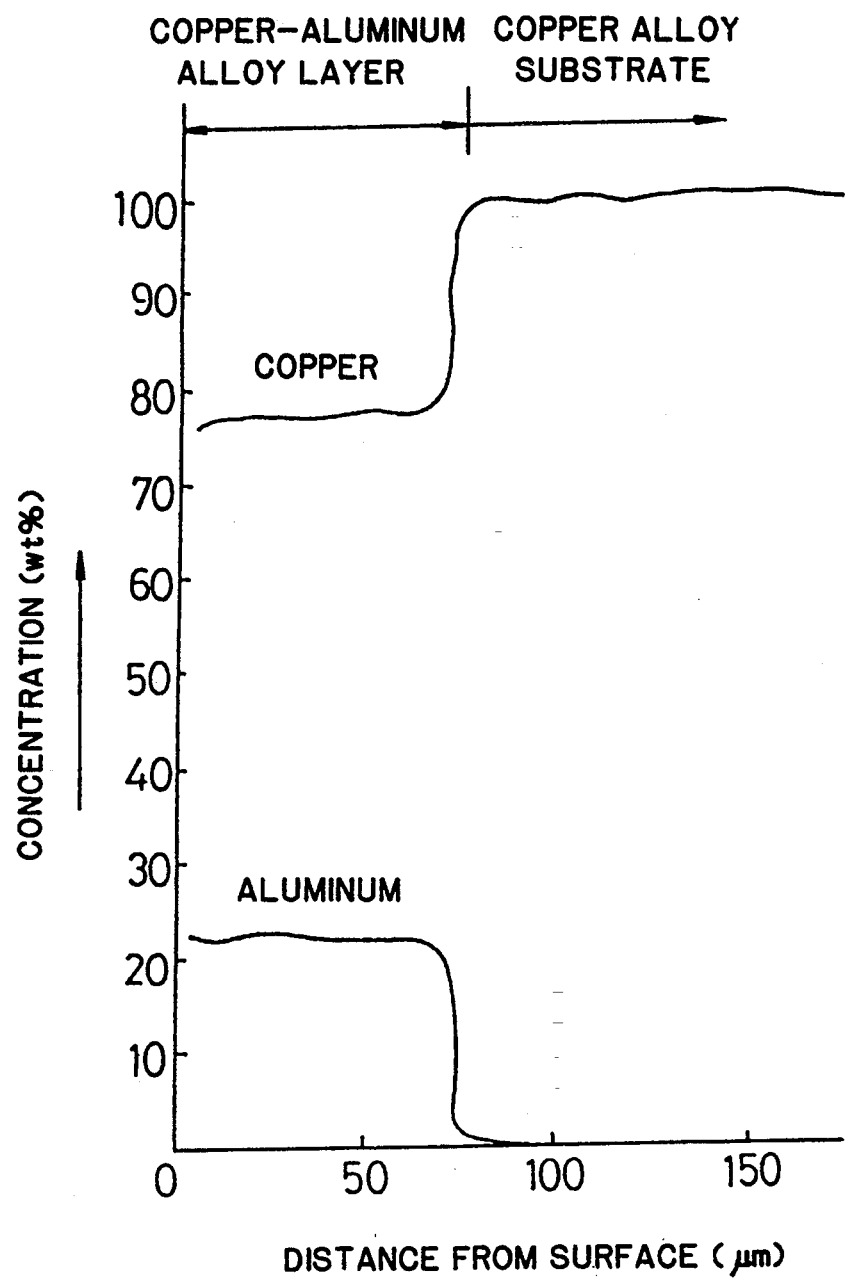
Figure 4:
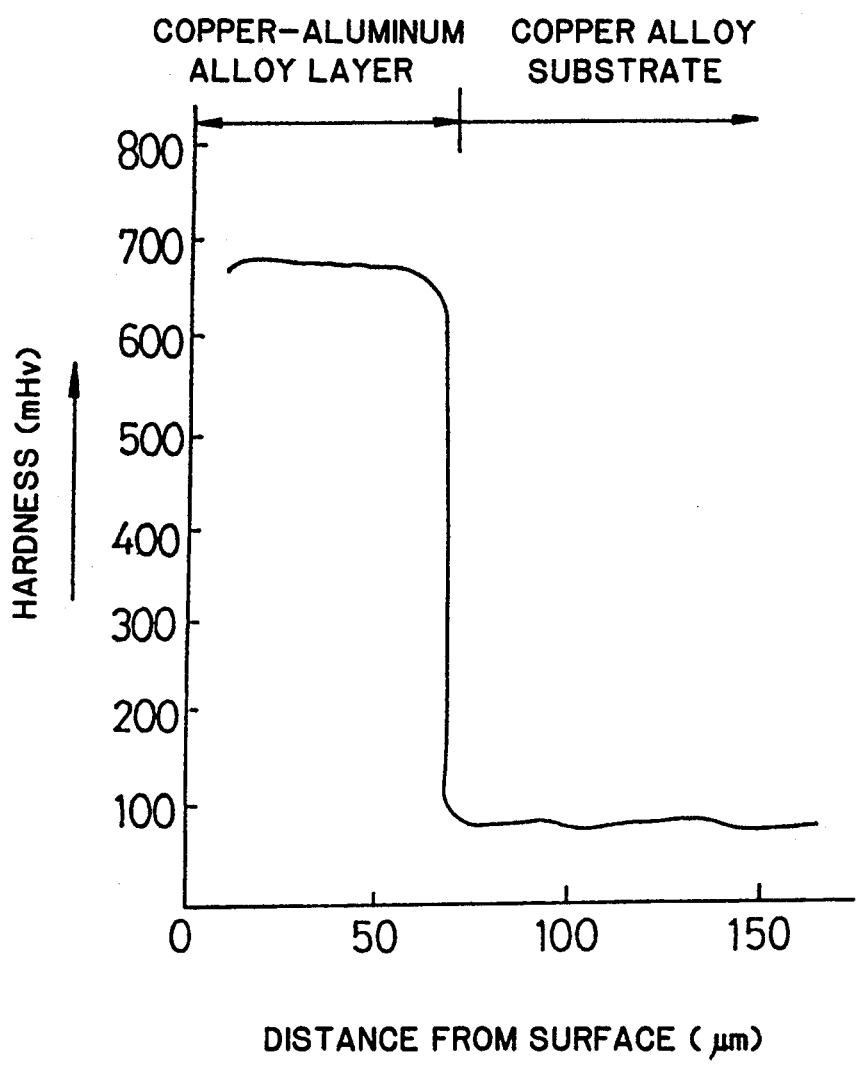
Figure 5:
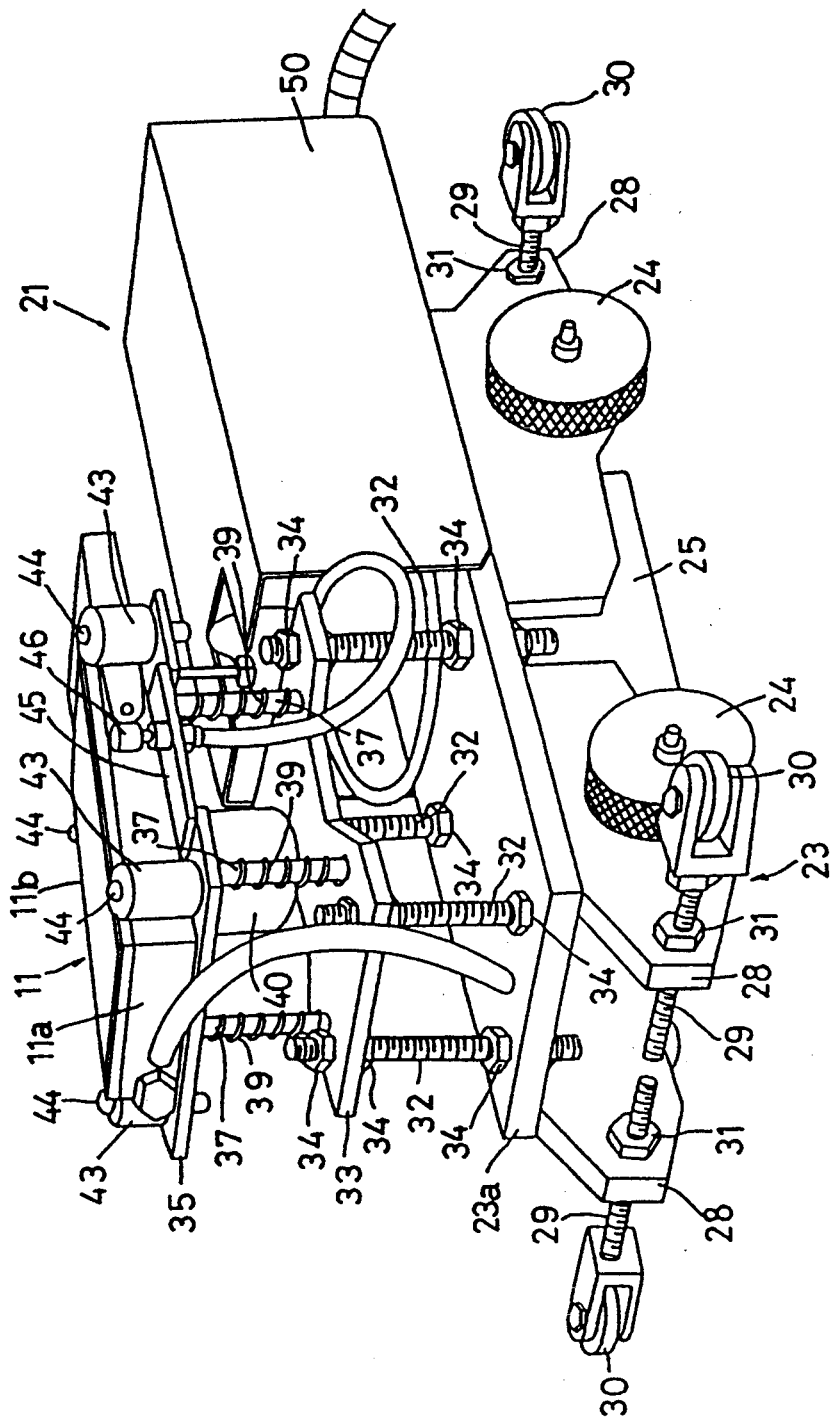
FIGS. 5 to 9 are for explaining a first example of the application of the weld backing of the invention to a movable backing positioning system.
Figure 6:
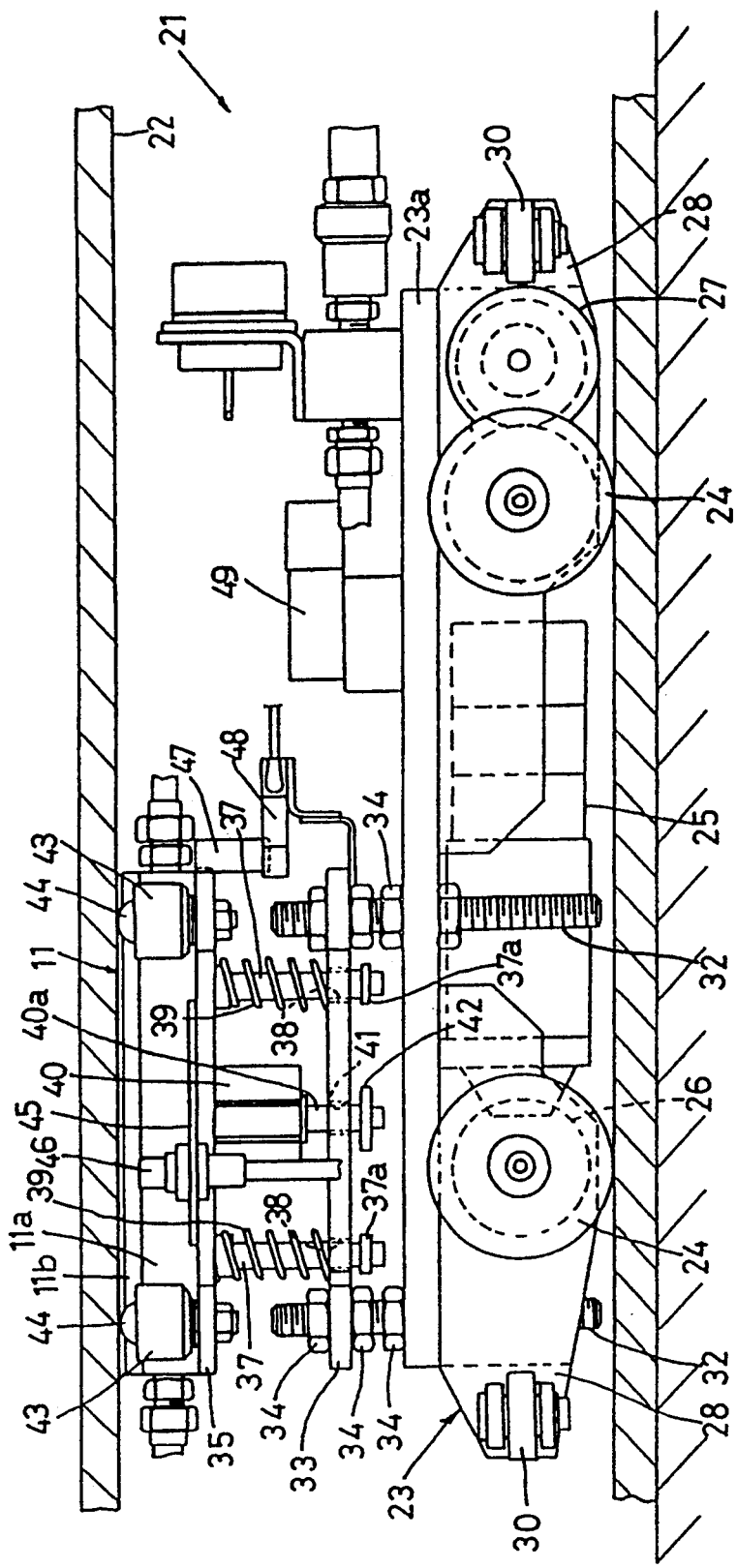
Figure 7:
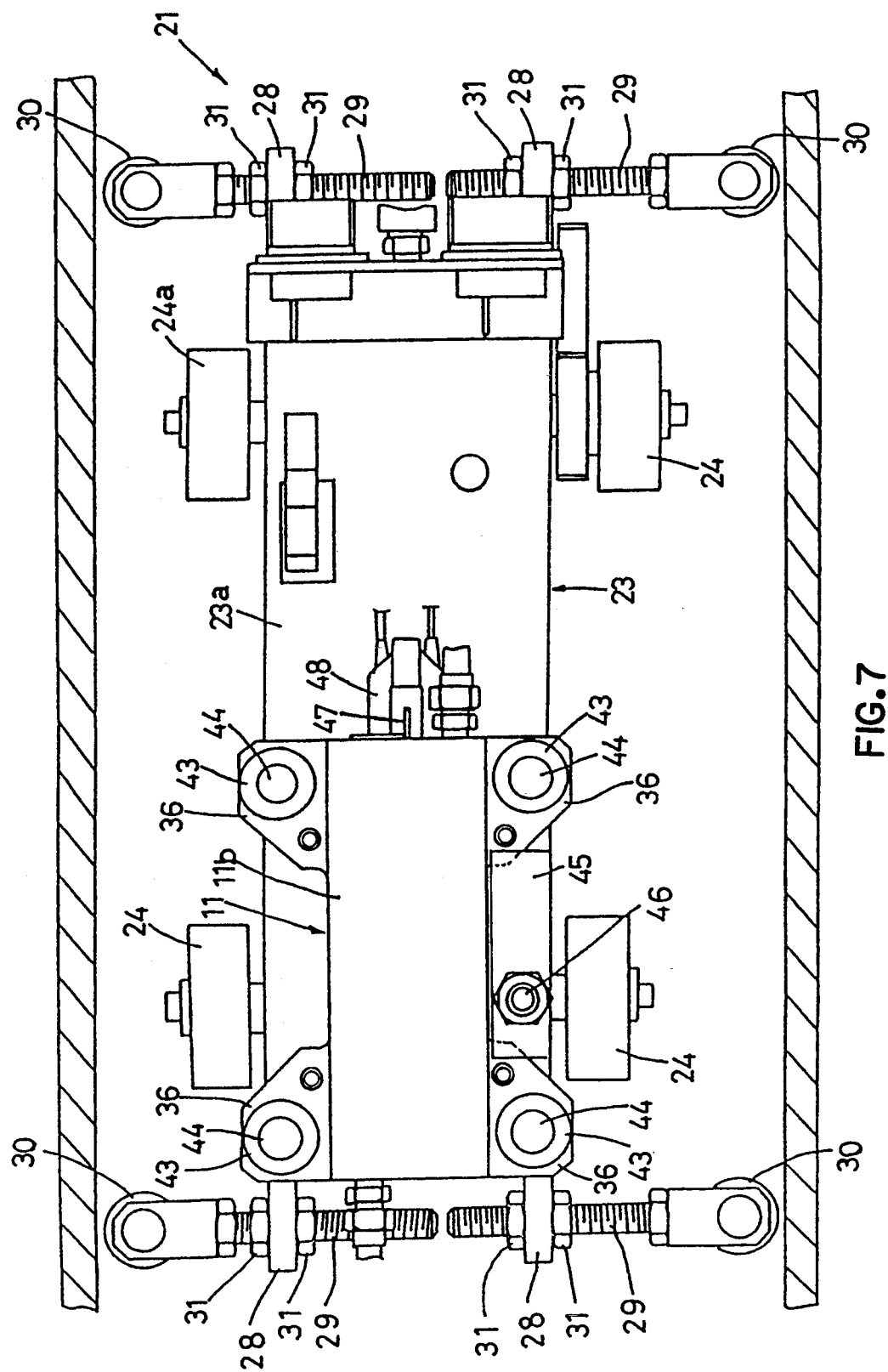

FIGS. 3 and 4 show the sectional composition analyzed by the EPMA analysis and hardness of the copper-aluminum alloy layer 16. It is understood from FIGS. 3 and 4 that the copper-aluminum alloy layer 16 is formed on the surface of the backing lid portion 11b, with an aluminum concentration of about 22 wt %, thickness of about 70 μm and hardness of about 680 mHv.

Although iron-aluminum alloy powder may be used as the aluminum penetrant instead of aluminum powder and alumina powder when the copper-aluminum alloy layer 16 is formed, the use of aluminum power and alumina powder is more preferable in view of the reaction speed and the concentration of aluminum contained.

Now there will be given an explanation on cases where such a weld backing 11 is mounted on a movable backing positioning system for full penetration welding, while making reference to the drawings.

Referring to FIGS. 5 to 9, a first application example will be described. A movable backing positioning system 21 of the first application example is suited for full penetration welding of a box-shaped workpiece 22 and includes a wheeled carriage 23 that is free to move on the inner bottom wall of the workpiece 22 in a lateral direction in FIGS. 6 and 7. The wheeled carriage 23 has four wheels 24 at the under part thereof, and the front wheels 24 (located at the left when viewing the drawings) are rotated by a DC servo motor 25 equipped with reduction gears through a bevel gear 26. The back wheels 24 are coupled by gears to a rotary encoder 27 that detects the rotation speed of the wheels 24. The rotary encoder 27 is used to control the travel speed of the wheeled carriage 23 and to detect the welding position.

The front end and rear end of the wheeled carriage 23 are provided with brackets 28 which are positioned at the right and left of each end. The brackets 28 at the front end project forwards while the brackets 28 at the rear end project backwards. An arm 29 is screwed in each bracket 28, extending laterally with respect to the wheeled carriage 23. Attached to the tip of each arm 29 is a guide roller 30 that is freely rotatable in a horizontal plane. These guide rollers 30 turn, moving along the side walls of the workpiece 22 when the wheeled carriage 23 moves forwards and backwards, so that the position of the wheeled carriage 23 in a lateral direction is restricted by the guide rollers 30. Two nuts 31 are fitted on each arm 29 so as to hold the bracket 28 between. By adjusting the positions of the nuts 31 with respect to the arms 29, the extent to which the arms 29 project laterally can be controlled.

Four threaded bars 32 are vertically threaded in an upper plate 23a of the wheeled carriage 23 at front part of the wheeled carriage 23. These threaded bars 23 are also threaded in a supporting plate 33 that is a specified distance apart from the top face of the upper plate 23a. Two pairs of nuts 34 are fitted on each threaded bar 32, such that the upper plate 23a and the supporting plate 33 are respectively tightened by these pairs of nuts 34 from the top and underside. By adjusting the positions of the nuts 34 with respect to the threaded bars 32, the spacing between the upper plate 23a and the supporting plate 33 of the wheeled carriage 23 can be controlled.

There is provided a backing retaining plate 35 that is positioned above and in parallel with the supporting plate 33. Fixedly attached to the top face of the backing retaining plate 35 is the hollow, rectangular parallelepiped weld backing 11 as already described above. The backing retaining plate 35 is provided with projecting parts 36 which are positioned at the front and rear parts of the backing retaining plate 35, projecting laterally. There are four struts 37 each of which is fixed to each projecting part 36, projecting downwardly in a vertical direction therefrom. Each of the struts 37 penetrates through each eye hole 38 defined in the supporting plate 33, extending downwards under the supporting plate 33. The tip of each strut 37 is provided with a retaining ring 37a. There are provided four compression springs 39 between the underside of the backing retaining plate 35 and the top face of the supporting plate 33, each surrounding each of the struts 37. The provision of the compression springs 39 allow the weld backing 11 to be resiliently supported on the supporting plate 33.

An air cylinder 40 is attached to the underside of the backing retaining plate 35 so as to be positioned at the center of the weld backing 11. The air cylinder 40 has a cylinder rod 40a penetrating through an eye hole 41 defined in the supporting plate 33 to extend downwards under the supporting plate 33. At the tip of the cylinder rod 40a, there is fixedly attached an engaging piece 42 that can be engaged with the supporting plate 33. By operating the air cylinder 40 to draw the cylinder rod 40a, the engaging piece 42 is engaged with the underside of the supporting plate 33. This engagement allows the weld backing 11 to be pulled towards the supporting plate 33, against the energizing force of the compression springs 39.

Cylindrical follower element retainers 43 are screwed in the top face of the backing retaining plate 35 at the corners thereof. Each of the follower element retainers 43 retains a follower element 44 at the center of the top face thereof. Each follower element 44 comprises a ball caster and is positioned so as to project upwards slightly above the top face of the weld backing 11. The follower elements 44 turn being in contact with the underside of the workpiece 22, so that a specified spacing can be kept between the weld backing 11 and the workpiece 22. The positions of the follower element retainers 43 in a vertical direction (i.e., the spacing between the weld backing 11 and the workpiece 22) can be controlled by adjusting the installation position of the follower element retainers 43 with respect to the backing retaining plate 35.

There is provided a workpiece detection sensor 46 at one side of the weld backing 11. The workpiece detection sensor 46 comprises a proximity switch attached to a rectangular plate 45 secured to the top of the backing retaining plate 35. The workpiece detection sensor 46 detects the presence or absence of the workpiece 22 in order to control the operation of the air cylinder 40. A detection piece 47 is attached to the rear end of the backing retaining plate 35, extending downwards, and a photoelectric detector 48 in the form of a groove is supported at the supporting plate 33, for detecting the detection piece 47. The photoelectric detector 48 detects the presence or absence of the detection piece 47 in order to judge whether the weld backing 11 is at an upper position or lower position. At the rear part of the wheeled carriage 23, a solenoid valve 49 for switching the operation of the air cylinder 40 and other control units are mounted and are covered with a dust proof cover 50 (although the dust proof cover 50 is not shown in FIGS. 6 and 7).

Figure 8:
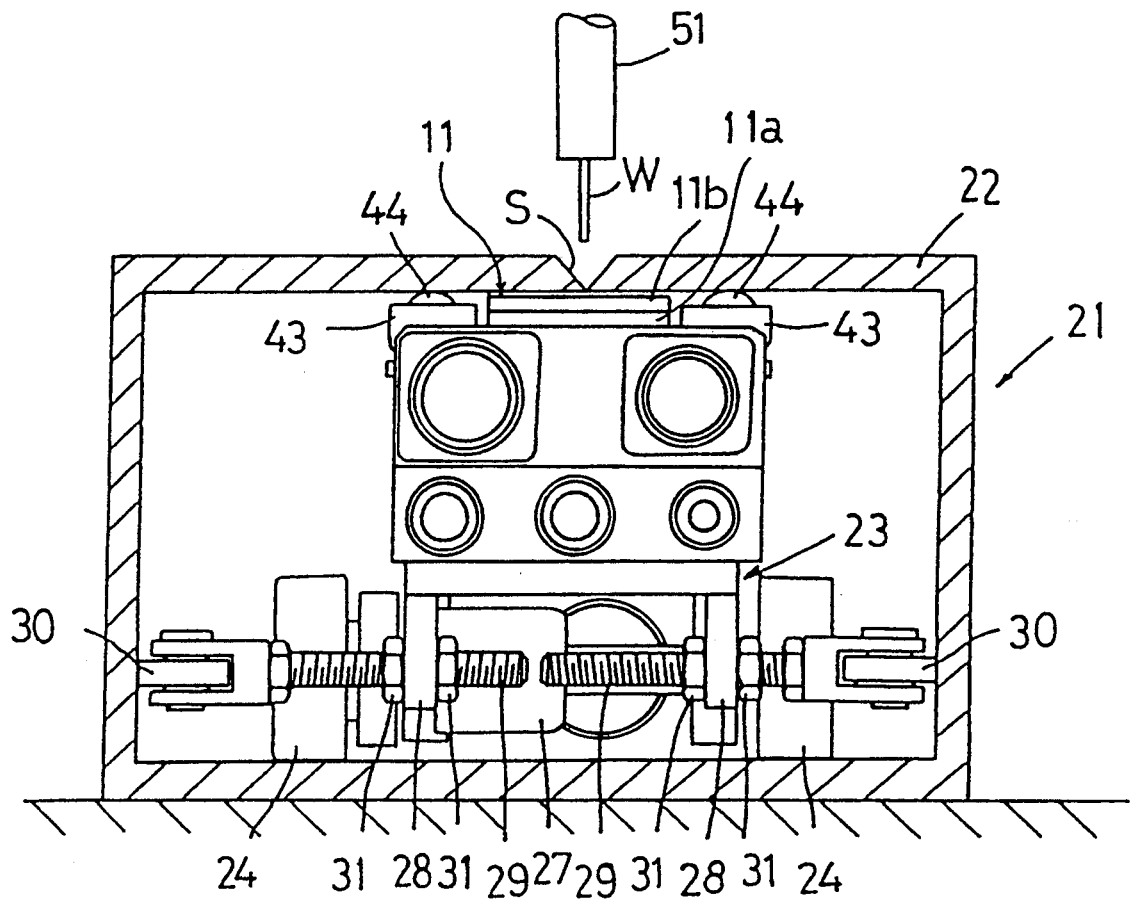
Figure 9:
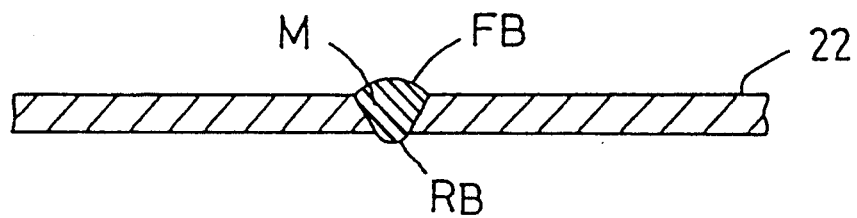

Reference is now made to FIGS. 8 and 9, for explaining the operation of the movable backing positioning system 21 as described above, taking an example in which full penetration welding is performed on the box-shaped workpiece 22.

As the preparatory stage. the vertical position of the supporting plate 33 in relation to the wheeled carriage 23 is adjusted such as to conform with the spacing between the inner top wall and inner bottom wall of the workpiece 22 by adjusting the positions of the threaded bars 32; the lateral positions of the arms 29 are adjusted such as to conform with the spacing between the inner side walls of the workpiece 22 and such that the groove face S of the workpiece 22 is positioned above the weld backing 11; and the installation positions of the follower element retainers 43 are adjusted such that the spacing between the underside of the workpiece 22 and the top face of the weld backing 11 becomes equal to the thickness of a penetration bead RB.

After the preparation, while the air cylinder 40 is operated to pull the weld backing 11 towards the supporting plate 33, against the energizing force of the compression springs 39, the wheeled carriage 23 is let in the interior space of the box-shaped workpiece 22 by actuating the DC servo motor 25. At that time, the position of the wheeled carriage 23 in a lateral direction of FIG. 8 is restricted by the guide rollers 30 disposed at the tip of the arms 29 and moving along the inner side walls of the workpiece 22. Thus, the wheeled carriage 23 moves along the weld line of the workpiece 22. The travel speed of the wheeled carriage 23 is controlled by a control unit (not shown) based on the rotation speed of the wheels 24 detected by the rotary encoder 27.

After the wheeled carriage 23 has started to travel and the leading end of the workpiece 22 has been detected by the workpiece detection sensor 46, a detection signal is released to the control unit so that the air cylinder 40 is operated to move the cylinder rod 40a forwards. The forward movement of the cylinder rod 40a allows the engagement piece 42 to be disengaged from the supporting plate 33, so that the weld backing 11 is raised by the energizing force of the compression springs 39 until the follower elements 44 come in contact with the underside of the workpiece 22. When the weld backing 11 accordingly reaches the upper position, the photoelectric detector 48 becomes conductive and thus detects that the weld backing 11 is in a normal position.

At this point, welding is started. A torch-like welder 51 moves in the same direction as the travel direction of the wheeled carriage 23, while fusing the wire W to fill the groove face S of the workpiece 22. The wheeled carriage 23 moves synchronously with the movement of the welder 51. During the movement of the wheeled carriage 23, the follower elements 44 turn and move, being in contact with the underside of the workpiece 22 and welding operation is thus carried out with the weld backing 11 being a specified distance kept away from the underside of the workpiece 22. When the workpiece detection sensor 46 detects the trailing end of the workpiece 22, the air cylinder 40 is operated to draw the cylinder rod 40a and the follower elements 44 is allowed to be out of the contact with the workpiece 22. In such welding operation, since the backing lid portion 11b (more specifically, the copper-aluminum alloy layer 16) of the weld backing 11, which directly contacts the penetration bead RB, is cooled by cooling water, thereby speeding up the solidification of the penetration bead RB maintained by surface tension, not only can the abrasion resistance and adherence resistance of the surface of the backing lid portion 11b be highly improved, but also damage to the weld backing 11b brought about by weld heat can be avoided.

FIG. 9 shows a section of the weld zone obtained by the full penetration welding.

As shown in the drawing, filler metal material M rises above the surface of the workpiece 22, forming a weld bead FB, while there is formed the penetration bead RB on the underside of the workpiece 22, the bead RB being formed by the filler metal material M leaked through the root. After welding has been done, these weld bead FB and penetration bead RB are removed by grinding so that they become flush with the surface and rear face of the workpiece 22 respectively or they remain without undergoing such a finishing treatment.

Although the above description has been made taking the case for example where full penetration welding is sequentially carried out with the wheeled carriage 23 moving from the leading end of the workpiece 22 to its trailing end, it is also possible to weld a local part of the workpiece 22 by the use of the movable backing positioning system 21. In this case, it is possible to arrange such that the travel distance of the wheeled carriage 23 is calculated from the rotation speed of the wheels 24 detected by the rotary encoder 27, and according to this calculation, the wheeled carriage 23 automatically travels to a desired weld position.

In this application example, the movable backing positioning system 21 is provided with the wheeled carriage 23 of the mobile type, however, the driving method of the wheeled carriage 23 is not necessarily limited to this. For example, the wheeled carriage 23 may be towed or pushed by the use of a pinion and rack mechanism driven by an independent actuator.

Although the movable backing positioning system 21 of the above application example includes the arms 29 that are secured to the wheeled carriage 23 with screws, the arms 29 may be attached to the wheeled carriage 23 through air cylinders and after letting the wheeled carriage 23 in the interior space of, for example, a box-shaped workpiece, the arms 29 may be extended by means of the air cylinders. The operation of the air cylinders can be controlled during the travel of the wheeled carriage 23, and this makes it possible to adjust the position of the weld backing 11 to conform with the weld line, even if the weld line is curved.

Figure 10:
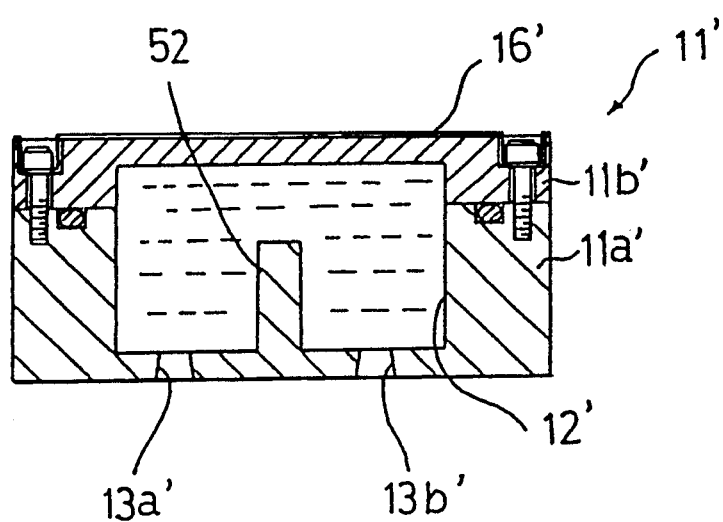
FIG. 10 is a sectional view of a weld backing according to a modification.

The construction of the cooling water chambers 12, 12a of the weld backing 11 of this embodiment could be modified. A modification of the weld backing of this embodiment is shown in FIG. 10. According to the modification, there are provided a cooling water inlet 13a' and a cooling water outlet 13b' at the right and left of the bottom of a cooling water chamber 12'. At the center of the bottom of the cooling water chamber 12' is disposed a weir 52. The provision of the weir 52 prevents the direct flow of cooling water from the cooling water inlet 13a' to the cooling water outlet 13b', which enhances the cooling effects on the backing lid portion 11b' and, more particularly, the copper-aluminum alloy layer 16'. The copper-aluminum alloy layer 16 is cooled by the circulation of cooling water in the above embodiment, but the layer 16 could be cooled by liquid air or the like stored in the chamber.

Figure 11:
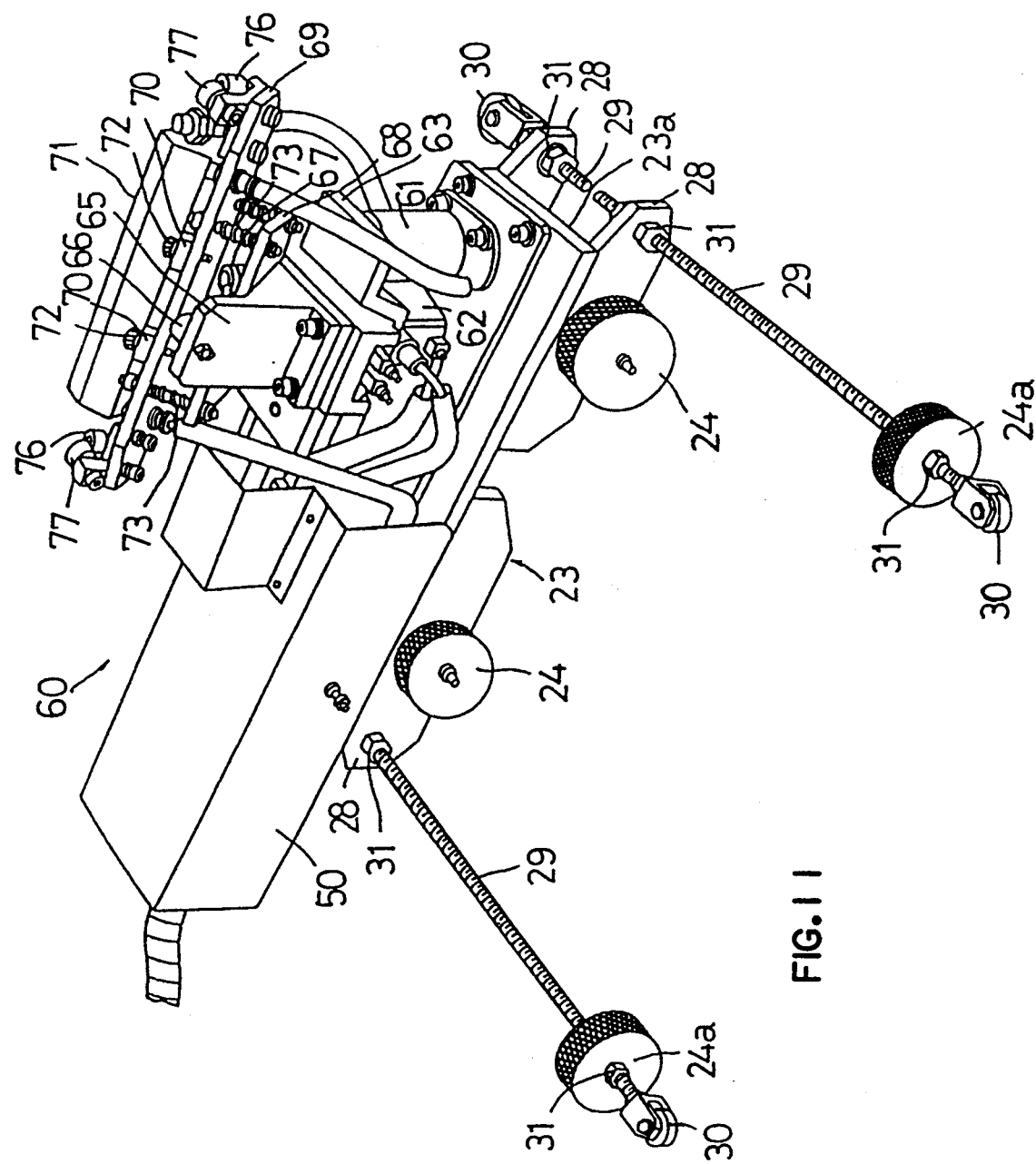
FIGS. 11 to 13 are for explaining a second example of the application of the weld backing of the invention to a movable backing positioning system.
Figure 12:
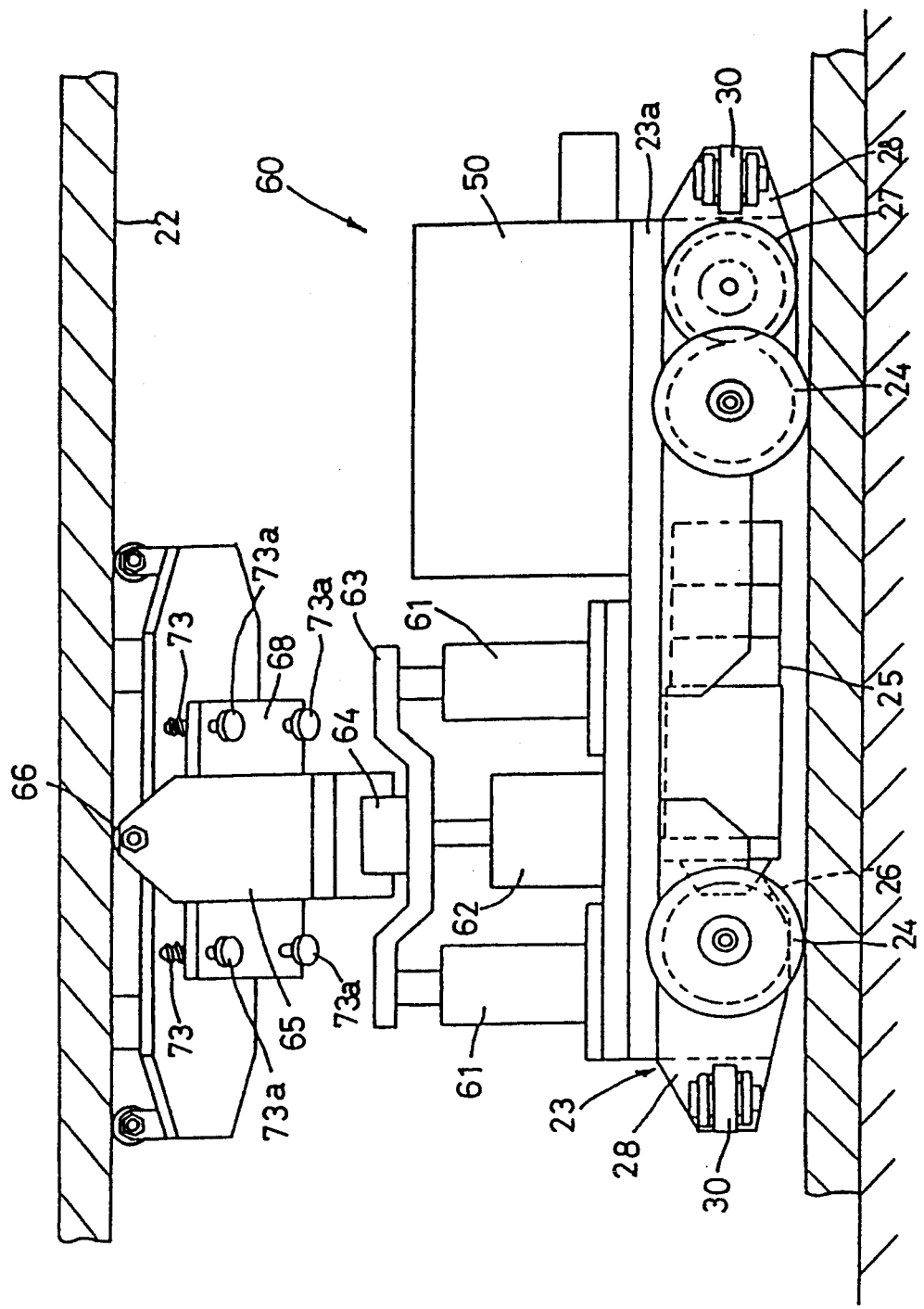
Figure 13:
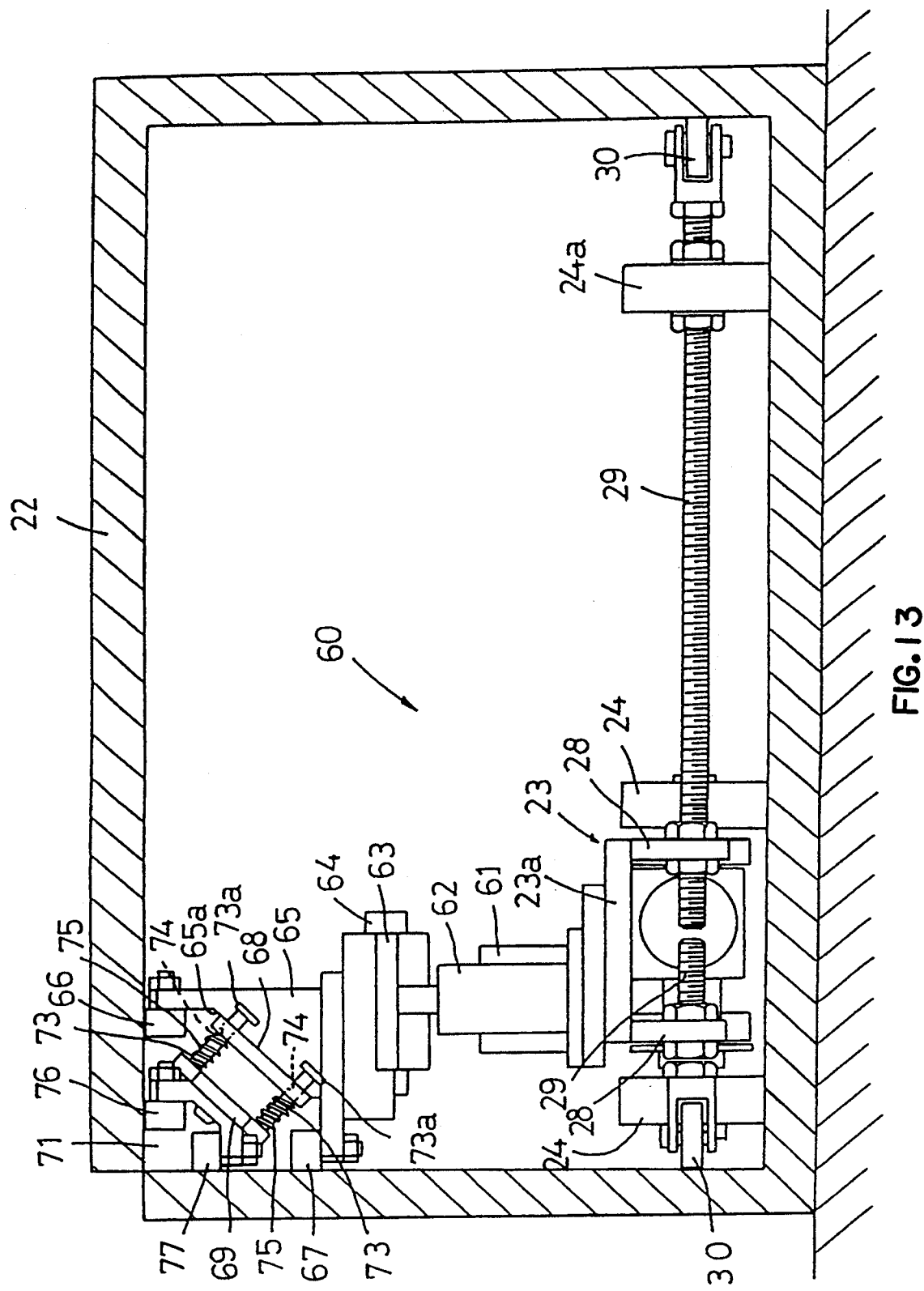

Referring to FIGS. 11 to 13, a second application example of the weld backing of the invention will be hereinafter described.

A movable backing positioning system 60 according to this example is applied to the case of welding of a corner joint. The construction and function of the wheeled carriage 23 and other members of the second application example are generally identical with those of the first application example. Therefore, only the characteristic features inherent to the second application example will be described in the following description. The parts that are substantially equivalent to the parts of the first application example are indicated in the drawings by the same numerals as used in the first application example and a detailed description on those parts will be omitted.

In the second application example, either one of the right and left arms 29 which are screwed in the brackets 28 of the wheeled carriage 23 is shorter than the other, and the longer arm 29 is equipped with an auxiliary wheel 24a in the vicinity of the tip thereof for supporting the arm 29. Disposed above the upper plate 23a of the wheeled carriage 23 is a base 63 that can be freely lifted or lowered by a vertical motion air cylinder 62 through front and back struts 61. A movable member 65 is disposed at the center of the base 63. This movable member 65 can be freely moved in a lateral direction (i.e., a direction perpendicular to the travel direction of the wheeled carriage 23) along a guide member 64 fixed at the base 63, by means of a horizontal motion air cylinder (not shown). The movable member 65 includes, at one side, an inclined face 65a inclined at 45° with respect to the horizontal plane and guide rollers 66 and 67 at the upper end and a side. These guide rollers 66, 67 turn, being in contact with the upper wall and side wall of the workpiece 22, respectively.

The inclined face 65a of the movable member 65 has a supporting plate 68 fixedly attached thereto, which is longer in size than the movable member 65 in a longitudinal direction. A backing retaining plate 69 is disposed above and in parallel with the supporting plate 68. A weld backing 71 is fixed on the top of the backing retaining plate 69 through two pedestals 70 and the position of the weld backing 71 is adjustable by means of adjusting bolts 72. Fixed to the backing retaining plate 69 are four struts 73 projecting towards the supporting plate 68. Each strut 73 extends downwards under the supporting plate 68, passing through an eye hole 74 formed on the supporting plate 68 and has a retaining ring 73a at the tip thereof. There are provided four compression springs 75 between the underside of the backing retaining plate 69 and the top of the supporting plate 68, each surrounding the strut 73. By the provision of the compression springs 75, the weld backing 71 is resiliently supported on the supporting plate 68. The backing retaining plate 69 is equipped with guide rollers 76 and 77 at its front and rear ends respectively. The guide rollers 76, 77 turn, being in contact with the upper wall and side wall of the workpiece 22 respectively and function to maintain a predetermined spacing between the weld backing 71 and the workpiece 22.

Figure 14A:
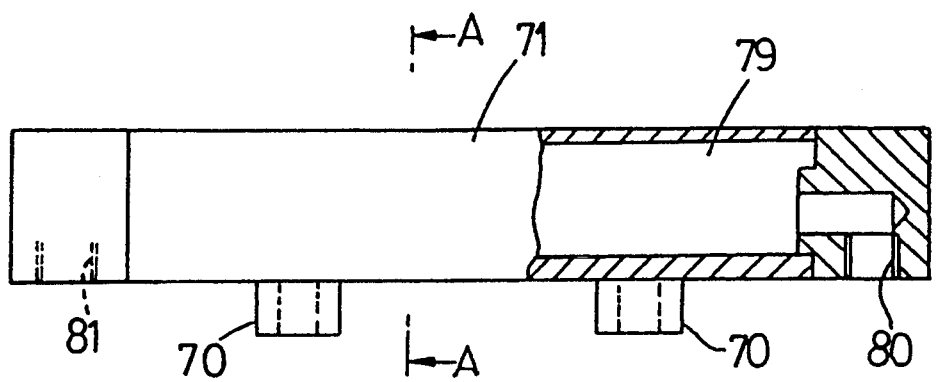
FIG. 14(a) is a side elevation, partially in section, of the weld backing.
Figure 14B:
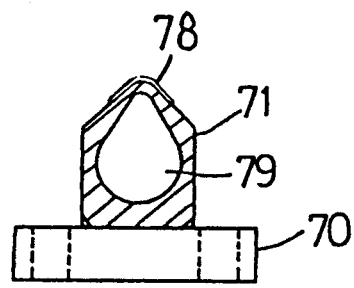
FIG. 14(b) is a section of the weld backing shown in FIG. 14(a) taken alone line A—A of FIG. 14(a)

The weld backing 71 of this application example is substantially pentagonal in section as shown in FIGS. 14(a) and 14(b), snugging in the corner of the workpiece 22, and its tip portion opposite to the workpiece 22 is chamfered. Although the weld backing 71 made from copper or a copper alloy according to the second application example could be composed of a backing box-shaped body portion and a backing lid portion which are separately formed like the first application example, the weld backing 71 described herein is formed as one unit and at least the surfaces of the chamfered portion is covered with a copper-aluminum alloy layer 73 having the above-described composition in order to ensure high abrasion resistance and adherence resistance. Like the first application example, the interior space of the weld backing 71 is a cooling water chamber 79 communicating with a cooling water inlet 80 and a cooling water outlet 81.

According to the movable backing positioning system 60 of this example, by moving the wheeled carriage 23 along the weld line with the weld backing 71 set in the corner of the workpiece 22, the guide rollers 30 provided at the tip of the arms 29 are guided along the inner side walls of the workpiece 22 and the guide rollers 66, 67, 76 and 77 are guided along the upper wall and side wall of the workpiece 22, so that the corner joint of the workpiece 22 in the form of, for example, a box can be continuously and easily welded.

Figure 15A:
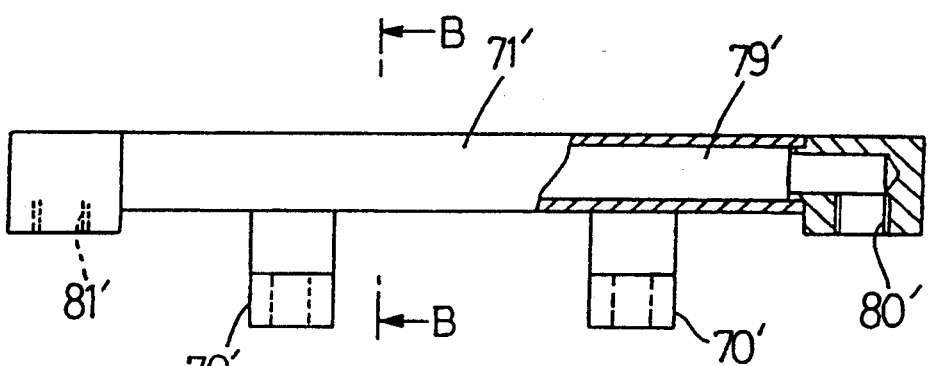
FIG. 15(a) is a side elevation, partially in section, of the weld backing.
Figure 15B:
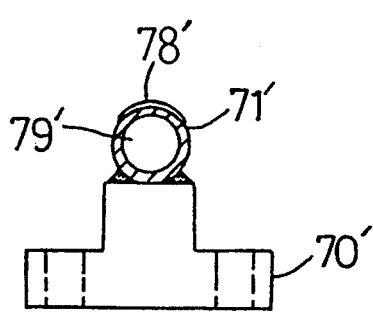
FIG. 15(b) is a section of the weld backing shown in FIG. 15(a) taken along line B—B of FIG. 15(a).

The weld backing 71 mounted on the top face of the backing retaining plate 69 could be produced in other shapes, according to the configuration of the penetration bead required. FIGS. 15(a) and 15(b) show a modification of the weld backing used in the second application example. A weld backing 71' according to the modification is formed from copper or a copper alloy into a cylindrical shape in order to obtain a rounded, smooth penetration bead. The peripheral face of the cylindrical weld backing 71' is covered with a copper-aluminum alloy layer 78', especially, at the position opposite to the workpiece 22. This weld backing 71' is secured to inverted T shaped pedestals 70'. In FIG. 15, reference numeral 79' represents a cooling water chamber, 80' represents a cooling water inlet, and 81' represents a cooling water outlet.

The movable backing positioning system 60 of the second application example can be possibly modified. For example, the arms 29 may be so disposed as to be shrunk and stretched in relation to the wheeled carriage 23, as described in the first application example.

Industrial Applicability

According to the invention, since the copper-aluminum alloy layer formed on the surface of the weld backing made from a material such as copper or a copper alloy has high abrasion resistance and high adherence resistance due to the low affinity to the penetration bead, the surface of the weld backing can be kept smooth so that full penetration welding can be carried out without troublesome weld backing replacement. The weld backing of the invention is suited for use in full penetration welding and suitably applicable to a movable backing positioning system that can be moved along the weld line of a workpiece.

Further, since the copper-aluminum alloy layer formed on the surface of the weld backing of the invention is cooled by a cooling means, the solidification of the penetration bead maintained by surface tension is speeded up. This brings about a further Improvement in the abrasion resistance and adherence resistance of the weld backing. Such a weld backing enables it to perform welding operation for a long period and therefore is particularly useful in the case of welding long workpieces with a continuous welding apparatus.

We claim:

1. A weld backing adapted to be held against the underside of a workpiece to provide weld-metal support in full penetration welding, comprising: a substrate made from copper or a copper alloy; and a copper-aluminum alloy layer containing 9 to 23% by weight of aluminum and formed at least on the surface of the substrate which faces a weld zone.

2. The weld backing as claimed in claim 1, wherein the copper-aluminum alloy layer has a hardness of 250 to 700 mHv.

3. The weld backing as claimed in claim 1, wherein the copper-aluminum alloy layer contains aluminum preferably in the range of 16 to 22% by weight.

4. The weld backing as in claim 1, wherein the copper-aluminum alloy layer has a thickness of 20 to 300 $\mu$m.

5. The weld backing as claimed in claim 1, further comprising cooling means for cooling the copper-aluminum alloy layer.

6. The weld backing as claimed in claim 5, wherein the cooling means is a cooling medium that is circulated or stored within an interior space defined in the weld backing.

7. The weld backing as claimed in claim 1, wherein the copper-aluminum alloy layer contains aluminum preferably in the range of 16 to 22% by weight and has cooling means for cooling the copper-aluminum alloy layer.

8. The weld backing as claimed in claim 1, which is made from copper or a copper alloy;
    wherein the copper-aluminum alloy layer is formed on the substrate made from copper or copper alloy; and
    wherein a cooling medium serving as the cooling means for cooling the copper-aluminum alloy layer is circulated or stored within an interior space defined in the weld backing.

9. The weld backing as claimed in claim 1, comprising a box-shaped body portion which is open at one end and closed at the other end so as to form a bottom and a lid portion for closing the opening end of the box-shaped body portion,
    wherein at least the lid portion is made from copper or a copper alloy and the copper-aluminum alloy layer is formed on the surface of the copper or copper alloy which forms the lid portion as the substrate, and
    wherein a cooling medium serving as cooling means for cooling the copper-aluminum alloy layer is circulated or stored within an interior space defined by the box-shaped body portion and the lid portion.

10. The weld backing as claimed in claim 8, wherein the cooling medium circulated within the interior space is introduced into the interior space through an inlet formed at one side of the interior space and let out through an outlet formed at the other side, and wherein the inlet and outlet are formed as to be offset from each other.

11. The weld backing as claimed in claim 8, wherein the cooling medium circulated within the interior space is introduced into the interior space through an inlet and let out through an outlet, the inlet and outlet being formed at the same side of the interior space, with an weir between.

12. The weld backing as claimed in claim 8, which is substantially pentagonal or circular in section.

13. The weld backing as claimed in claim 1, wherein the copper-aluminum alloy layer is formed by applying aluminum infiltration treatment to the surface of the substrate made from copper or a copper alloy.

14. The weld backing as claimed in claim 1 which is mounted on a movable backing positioning system comprising:
    (a) a wheeled carriage for movably supporting the weld backing at the underside of the workpiece so as to face the weld backing to the workpiece towards the workpieces, the carriage being movable along a weld line of the workpiece;
    (b) follower elements attached to the weld backing, which follow along the movement of the underside of the workpiece, being in contact with the underside of the workpiece all the time to maintain the gap between the underside of the workpiece and the weld backing to be suitable for obtaining desired bead thickness; and
    (c) energizing means for energizing the weld backing such that the follower elements are always in contact with the underside of the workpiece.

* * * * *